(12) United States Patent
Ostermann et al.

(10) Patent No.: US 8,308,404 B2
(45) Date of Patent: Nov. 13, 2012

(54) TOOL HOLDER PROVIDED WITH A DAMPING MEANS

(75) Inventors: Mathieu Ostermann, Saverne (FR); Alain Freyermuth, Pfaffenhoffen (FR)

(73) Assignee: E.P.B., Bouxwiller (FR)

( * ) Notice: Subject to any disclaimer, the term of this patent is extended or adjusted under 35 U.S.C. 154(b) by 265 days.

(21) Appl. No.: 12/384,814

(22) Filed: Apr. 9, 2009

(65) Prior Publication Data
US 2009/0257838 A1 Oct. 15, 2009

(30) Foreign Application Priority Data
Apr. 10, 2008 (FR) ...................................... 08 52416

(51) Int. Cl.
*B23B 29/02* (2006.01)
(52) U.S. Cl. ........................................ 409/141; 408/143
(58) Field of Classification Search .................. 409/141, 409/234; 408/143, 238–240; 267/137; 188/378–380
See application file for complete search history.

(56) References Cited

U.S. PATENT DOCUMENTS

| 3,242,791 | A | * | 3/1966 | Smith ............................ | 188/379 |
| 3,774,730 | A | * | 11/1973 | Maddux ........................ | 188/379 |
| 3,838,936 | A | * | 10/1974 | Andreassen et al. .......... | 408/143 |
| 5,700,116 | A | * | 12/1997 | Cobb, Jr. ....................... | 409/141 |
| 7,028,997 | B2 | * | 4/2006 | Takahashi et al. ............ | 267/137 |
| 7,234,379 | B2 | * | 6/2007 | Claesson et al. ............... | 82/1.11 |
| 7,661,912 | B2 | * | 2/2010 | Onozuka et al. .............. | 408/143 |

FOREIGN PATENT DOCUMENTS

| DE | 18 97 206 U | | 7/1964 |
| JP | 61076251 A | * | 4/1986 |
| JP | 2001328022 A | * | 11/2001 |
| JP | 2005186240 A | * | 7/2005 |
| JP | 2005279819 A | * | 10/2005 |

* cited by examiner

*Primary Examiner* — Daniel Howell
(74) *Attorney, Agent, or Firm* — The Watson I.P. Group, PLC; Jovan N. Jovanovic; Vladan M. Vasiljevic

(57) ABSTRACT

The present invention relates to a tool holder, such as a reaming head (1), or a milling arbor, provided with a damping means (2) in the form of an elongated body, which is arranged in an end compartment (3) of the tool holder (1), which compartment is of appropriate shape and size, and closed at its end by a body (4) for receiving a reaming head or by a milling element.
Tool holder characterized in that the damping means (2) is of the type presenting only radial absorption, and it is provided with at least one elastically deformable means (5), at least close to each end, where said elastically deformable means (5) extend between the envelope of the damping means (2) and the wall of the compartment (3) of the tool holder (1), and are clamped between the wall of the compartment (3) and the damping means (2), and where the ends of the damping means extend in the compartment (3) without stress.
The invention is applicable more particularly in the field of accessories for machine tools, with digital control, machining centers, flexible cells and workshops.

10 Claims, 2 Drawing Sheets

TOOL HOLDER PROVIDED WITH A DAMPING MEANS

CROSS-REFERENCE TO RELATED APPLICATION

Applicant claims priority from French Patent Application No. 0852416 filed Apr. 10, 2008, the entire specification of which is incorporated by reference herein.

BACKGROUND OF THE INVENTION

1. Field of the Invention

The present invention relates to the field of accessories for machine tools, with digital control, machining centers, flexible cells and workshops, and it relates to a tool holder provided with a damping means.

2. Background Art

Tool holders tend to vibrate, because of their very construction, which has a detrimental effect on their proper functioning. There is an increase in this tendency to vibrate, particularly because the operating speeds of current machine tools are constantly becoming faster.

To overcome these disadvantages, it has been proposed to provide the tool holders with an oscillation damping device that allows an adaptation of their rigidity to the work conditions.

To this effect, a device is currently known, notably from U.S. Pat. No. 3,447,402, which consists essentially of a damping weight that is installed in an axial housing, and held in the latter by clamping between elastically deformable masses, where the regulation of the stiffness is carried out through the intermediary of a spring-loaded abutment means, and the calibration of this device itself can be regulated through the intermediary of a screw device.

Moreover, from FR-A-2 173 957, an adjustable damping device for machine tools is known, which consists of a damping device which is placed in an axial hole of a tool holder arbor, and which is connected to this arbor through the intermediary of annular elastic elements that are mounted on conical ends of the damping device, and can be compressed between said ends, to regulate the rigidity.

EP-A-0 571 490 describes another damping device, which consists of a central cylindrical support which is housed in the body of the tool holder, and on which a damping body is mounted. This damping body is connected to the central cylindrical support through the intermediary of elastic elements which are arranged in the ends of the damping bodies, and held through the intermediary of gaskets that are connected to the central support. A similar device is described in EP-A-1 248 692.

In all these known devices, the damping device is held in the axial hole by action on the ends of the device through the intermediary of elastically deformable elements; however, this is achieved only by action on said ends, without any contact between said elastically deformable elements and the generator of the damping device (U.S. Pat. No. 3,447,402 and FR-A-2 173 957). The two documents that describe the use of a central cylindrical support also do not provide for any contact between the generator of the damping device and the elastically deformable element, which, moreover, would be in contact with the housing of the damping device.

As a result, such a damping device can act on the rigidity of an arbor only at its ends, so that the damping tends to occur axially, and can thus not be optimal.

SUMMARY OF THE INVENTION

The purpose of the present invention is to overcome these disadvantages by proposing a tool holder which is equipped with a damping means that makes it possible to eliminate the vibrating effects due to the cutting forces and the machining speeds, while being of simple design, and easy to use.

To this effect, the tool holder, such as a reaming head, or a milling arbor, which is provided with a damping means in the form of an elongated body that is arranged in an end compartment of the tool holder, where the compartment presents a corresponding shape and size, and is closed at its end by a body for receiving a reaming head or by a milling element, is characterized in that the damping means is of a type which absorbs only radially, and it is provided with at least one elastically deformable means, at least close to each end, where said elastically deformable means extend between the envelope of the damping means and the wall of the compartment of the tool holder, and are clamped between the wall of the compartment and the damping means, and where the ends of the damping means extend without stress in the compartment 3.

BRIEF DESCRIPTION OF THE DRAWINGS

The invention will be understood better using to the following description, which refers to preferred embodiments that are given as nonlimiting examples, and explained in reference to the schematic drawing in the appendix, in which.

DETAILED DESCRIPTION OF THE DRAWINGS

Figure 1:
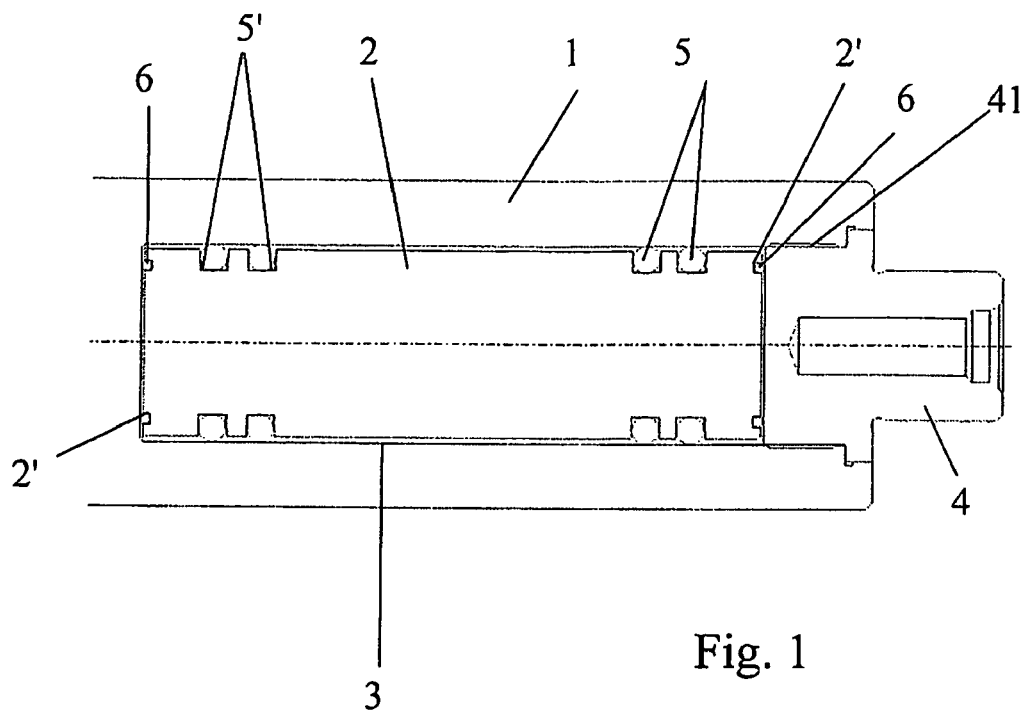
FIG. 1 is a cross-sectional view of a tool holder that is provided with a damping means according to the invention.
Figure 2:
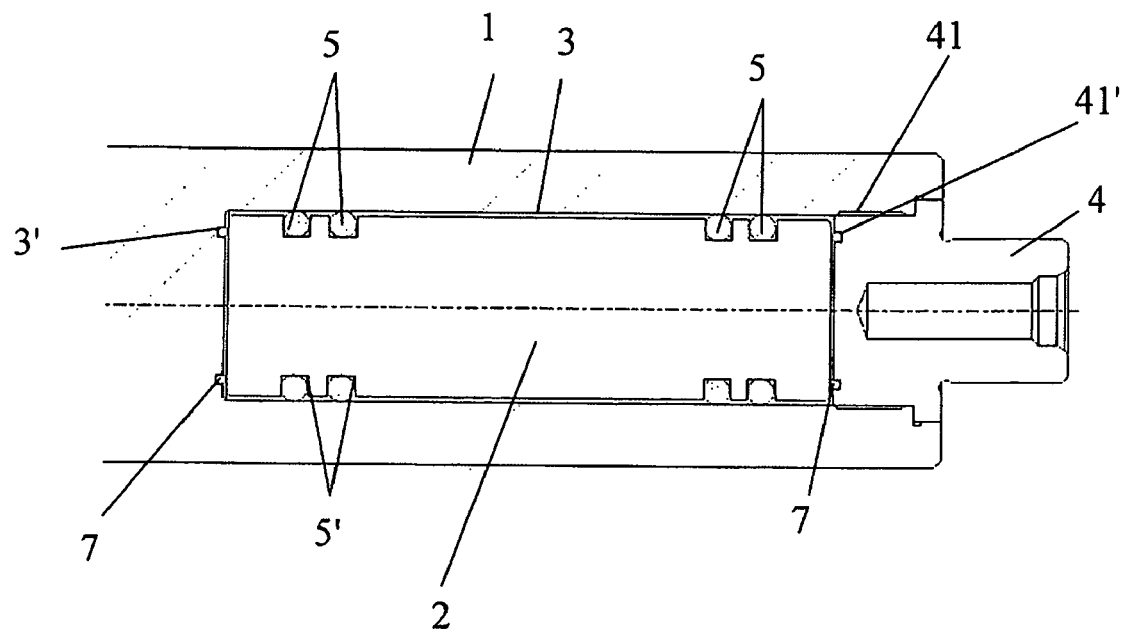
FIG. 2 is a view that is analogous to that of FIG. 1 of a first embodiment variant of the invention.
Figure 3:
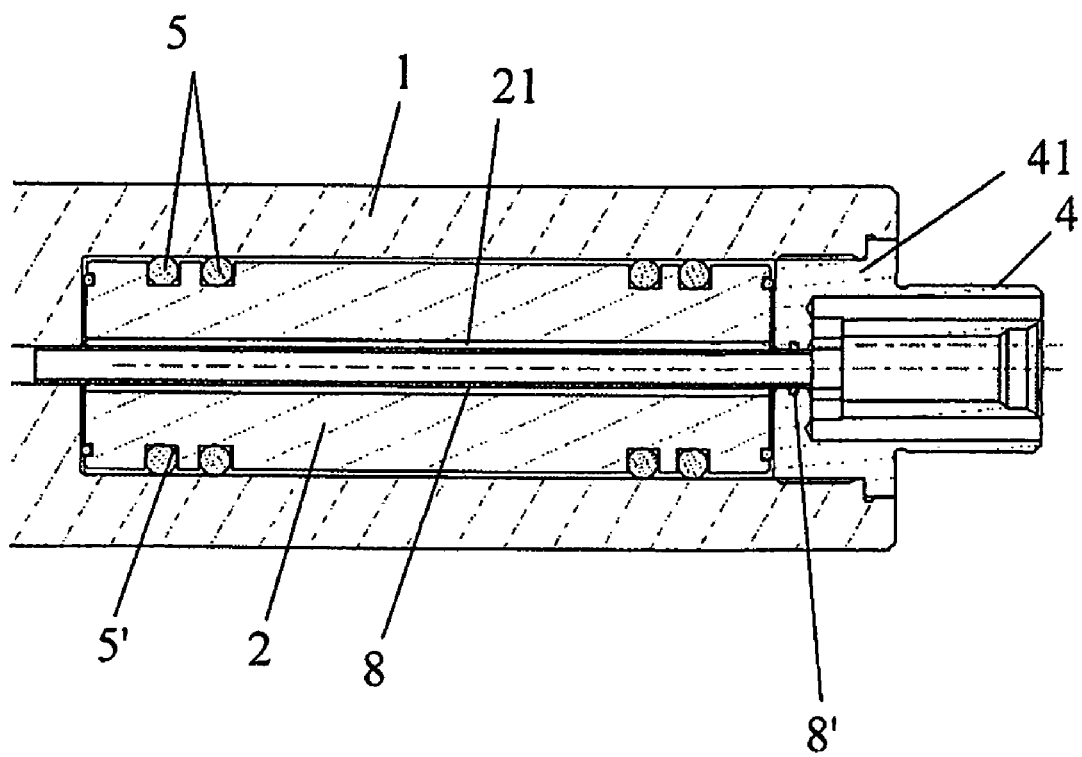
FIG. 3 is a view that is analogous to that of FIGS. 1 and 2 of a second embodiment variant of the invention.

FIGS. 1-3 of the drawing in the appendix represent, as examples, a tool holder in the form of a reaming head 1, which holder is provided with a damping means 2 which is in the form of an elongated body arranged in an end compartment 3 of the tool holder 1, where the compartment presents a corresponding shape and size, and is closed at its end by a body 4 for receiving a reaming head. In a known way, the closing of the end of the compartment 3 of the tool holder 1 is achieved by direct screw attachment of the centering device 41 of the body 4 for receiving a reaming head or by fitting this body 4 in the end of the compartment by clamping through the intermediary of screws. FIGS. 1-3 represent an embodiment example of the invention; however, the invention is naturally also applicable for use in a milling tool holder, for example.

In a known way, the compartment 3 of the tool holder 1 is produced in such a way that it causes at most a static rigidity loss of 5% with respect to the solid cylinder, and the depth of the compartment is equal to two times the diameter of the tool holder 1. In the case of the use of a tool holder 1 in the form of a reaming head, the body 4 for receiving said reaming head is provided advantageously with a centering device 41 which is screwed with fine pitch into the tool holder 1, and whose rotation is blocked through the intermediary of tenons that are not shown.

According to the invention, the damping means 2 is of the type with only radial absorption, and it is provided with at least one elastically deformable means 5, at least near each end, where said elastically deformable means 5 extend between the envelope of the damping means 2 and the wall of the compartment 3 of the tool holder 1, and are clamped between the wall of the compartment 3 and the damping means 2, and where the ends of the damping means extend in the compartment 3 without stress. Thus, the damping means 2 is held in the compartment 3 of the tool holder 1 only by elastically deformable means 5, and its ends are free, on the one hand, with respect to the bottom of the compartment 3, and, on the other hand, with respect to the back face of the body 4 for receiving a reaming head or other part. The absence of stress on the ends of the damping means 2 makes it possible for any action of the latter to occur exclusively in the radial direction.

Preferably, and as shown in FIGS. 1-3 of the drawing in the appendix, the elastically deformable means 5 are advantageously annular elements made from a damping material, and they are fixed to the damping means 2 by cooperation with annular grooves 5' provided in said damping means 2. Such an embodiment of the damping means 2 makes it possible to eliminate any procedure for regulating the rigidity conferred by the damping means 2, and thus simplifies the use of the latter while optimizing its functioning.

According to another characteristic of the invention, the damping means 2 can be provided by more than two elastically deformable means 5. Advantageously, in such a case, the elastically deformable means 5 is arranged at regular intervals and in equal number starting from each end. Thus, it is possible to vary the damping frequencies, and thus the rigidity of the tool holder 1.

To avoid an effect of shock or of longitudinal swiveling of the damping means 2 in the compartment 3, against the bottom of said compartment 3 or against the centering device 41 of the body 4 for receiving a reaming head or other part, each end face of the damping means 2 is provided advantageously, according to a first embodiment of the invention, with a circular groove 2' for accommodating a ring-joint gasket 6, where the length of the damping means 2 which is provided with the ring-joint gasket 6 is slightly less than the length of the compartment 3 which is closed by the centering device 41 of the body 4 for receiving a reaming head or other part.

According to an embodiment variant of the invention, and as shown in FIG. 2 of the drawing in the appendix, the effect of shock or of longitudinal flutter can also be prevented by providing a circular groove 3', 41', in the bottom of the compartment 3 and on the back face of the centering device 41, respectively, of the body 4 for receiving a reaming head or other part, where these circular grooves 3', 41' are provided with ring-joint gaskets 7, and the distance between the ring-joint gasket 7 in the installed position of the damping device 2 is slightly greater than the length of the damping means 2. Thus, the damping means 2 is accommodated in the tool holder 1 with a possibility of a very small axial displacement, but without clamping.

As an example, the elastically deformable means 5 as well as the gaskets 6 and 7 are made preferably in the form of O-rings made of nitrile, and the damping means 2 is made advantageously from high-density steel.

According to the invention, the damping means 2 is intended to react by phase opposition with respect to the displacement of the tool holder 1, thus stabilizing the latter. Thus, for the assembly consisting of the damping means 2 and the elastically deformable means 5 to have an optimal effect, this assembly must be placed at maximum amplitude, i.e., as close as possible to the cutting edge, and thus in the compartment 3 in front of the tool holder. In addition, this assembly must have an eigenfrequency that is equal to the first eigenfrequency of the tool holder 1.

The damping means 2 thus is dimensioned as a function of the displacement that is allowable for the tool holder 1.

It is preferred, according to another characteristic of the invention, for the damping means 2 to present a diameter that is less than that of the compartment 3 of the tool holder 1 by approximately 1 mm, and for the elastically deformable means 5 to present an outer diameter that is greater than the inner diameter of the compartment 3 by a value of 0.1-0.9 mm. As a result, the damping means 2 can theoretically have a lateral displacement of approximately 1 mm with respect to its diameter, or approximately 0.5 mm with respect to the radius. Providing oversized elastically deformable means 5, with respect to the diameter of the compartment 3, ensures an installation without any play of said damping means 2 in the compartment 3, thus producing a predefined rigidity of the tool holder 1.

The search for an increased rigidity can be solved by a symmetric increase in the number of elastically deformable means 5 at each end of the damping means 2.

FIG. 3 of the drawing in the appendix represents another embodiment of the invention, in which the damping means 2 is provided with an axial perforation 21, through which a lubricant supply tube 8 passes. This tube 8 is, on the one hand, fixed permanently in the tool holder 1, at the bottom of the compartment 3, by gluing or other means, and, on the other hand, it is assembled through the intermediary of an O-ring 8' to the centering device 41 of the body 4 for receiving a reaming head or other part. Thus, the tube 8 passes completely through the damping means 2; however, it is never in direct contact with the latter or with a wall that works in cooperation with said damping means 2.

Thanks to the invention, a damping means for a tool holder can be produced that can be used with all types of tool holders, and whose displacement occurs exclusively in the radial direction.

Moreover, this damping means 2 requires no additional element or specific regulation procedure, while allowing an optimal functioning.

Naturally, the invention is not limited to the embodiments that have been described and represented in the drawing of the appendix. Modifications remain possible, notably with regard to the constitution of the different elements, and substitutions can be made using technical equivalents, without however going beyond the scope of protection of the invention.

What is claimed is:

1. Tool holder provided with a damping means (2) in the form of an elongated body having a substantially cylindrical surface, which is arranged in an end compartment (3) of the tool holder (1) having a substantially cylindrical surface corresponding to the substantially cylindrical surface of the elongated body, and closed at its end by a body (4) for receiving a rotative tool like a reaming head or by a milling element, wherein the substantially cylindrical surface of the elongated body and the substantially cylindrical surface of the end compartment of the tool holder define a substantially uniform envelope therebetween, characterized in that the damping means (2) includes at least one elastically deformable means (5), at least close to each end of the cylindrical surface of the elongated body, where said elastically deformable means (5) extend between the envelope of the substantially cylindrical surface of the elongated body of the damping means (2) and the substantially cylindrical surface of the end compartment (3) of the tool holder (1), and are clamped between the wall of the compartment (3) and the damping means (2) to carry out the absorption of radial vibration movements provided by the held rotative tool and transmitted to the compartment (3) of the tool holder (1), and where the ends of the damping means in operable position are spaced apart from the end of the end compartment, such that shocks provided by slight axial movements of the damping means (2) itself in the compartment (3) are absorbed by the at least one elastically deformable means substantially without axial compression.

2. Tool holder according to claim 1, characterized in that the elastically deformable means (5) are annular elements made from a damping material, and fixed to the damping means (2) by cooperation with annular grooves (5') provided in said damping means (2).

3. Tool holder according to claim 1, characterized in that the damping means (2) is provided with more than two elastically deformable means (5).

4. Tool holder according to claim 1, characterized in that the elastically deformable means (5) are arranged at regular intervals and in equal numbers starting from each end.

5. Tool holder according to claims 1, characterized in that each end face of the damping means (2) is provided with a circular groove (2') for accommodating a ring-joint gasket (6), where the length of the damping means (2) that is provided with ring-joint gaskets (6) is slightly less than the length of the compartment (3) that is closed by the centering device (41) of the body (4) for receiving a reaming head or other part.

6. Tool holder according to claim 1, characterized in that the bottom of the compartment (3) and the back face of the centering device (41) of the body (4) for receiving a reaming head or other part are provided with a circular groove (3' and 41'), respectively, where these circular grooves (3', 41') are provided with ring-joint gaskets (7), and the distance between the ring-joint gaskets (7) in the installed position of the damping means (2) is slightly greater than the length of the damping means (2).

7. Tool holder according to claim 1, characterized in that the damping means (2) is accommodated in the tool holder (1) with a possibility for a very small axial displacement, but without clamping.

8. Tool holder according to claim 5, characterized in that the elastically deformable means (5) as well as the gaskets (6) comprise O-rings made of nitrile, and the damping means (2) is made from a high-density steel.

9. Tool holder according to claim 1, characterized in that the damping means (2) presents a diameter that is less than that of the compartment (3) of the tool holder (1) by approximately 1 mm, and the elastically deformable means (5) present an outer diameter that is greater than the inner diameter of the compartment (3) by a value of 0.1-0.9 mm.

10. Tool holder according to claim 1, characterized in that the damping means (2) is provided with an axial perforation (21) through which a lubricant supply tube (8) passes.

* * * * *